US008655047B1

(12) United States Patent
Walker et al.

(10) Patent No.: US 8,655,047 B1
(45) Date of Patent: Feb. 18, 2014

(54) ELECTRONIC CHECK AND STUB SEPARATION

(75) Inventors: Robert Bradley Walker, Waxhaw, NC (US); Ellen Anne O'Hare, Darien, IL (US)

(73) Assignee: Bank of America Corporation, Charlotte, NC (US)

(*) Notice: Subject to any disclaimer, the term of this patent is extended or adjusted under 35 U.S.C. 154(b) by 975 days.

(21) Appl. No.: 12/341,328

(22) Filed: Dec. 22, 2008

(51) Int. Cl.
*G06K 9/00* (2006.01)

(52) U.S. Cl.
USPC ............................................ 382/139

(58) Field of Classification Search
None
See application file for complete search history.

(56) References Cited

U.S. PATENT DOCUMENTS

| 5,842,577 | A | 12/1998 | Stevens et al. |
| 5,926,392 | A | 7/1999 | York et al. |
| 7,494,052 | B1* | 2/2009 | Carpenter et al. ............ 235/379 |
| 8,155,425 | B1* | 4/2012 | Mandel ........................ 382/140 |
| 2002/0104782 | A1 | 8/2002 | DeWitt et al. |
| 2005/0189272 | A1* | 9/2005 | DiBiaso et al. .............. 209/584 |
| 2007/0045930 | A1 | 3/2007 | Hayduchok et al. |
| 2008/0168439 | A1* | 7/2008 | Anderson et al. ................ 718/1 |

* cited by examiner

*Primary Examiner* — Claire X Wang
(74) *Attorney, Agent, or Firm* — Michael A. Springs; Moore & Van Allen, PLLC; Sreenivas Vedantam (57) ABSTRACT

Systems, methods, and computer program products are provided for automating the separation of a check and a stub attached to the check in a payment receiving and processing system. For example, one embodiment of the invention involves a computerized apparatus configured to receive a document image, locate a Magnetic Ink Character Recognition (MICR) line in the document image, and capture a check image by capturing a portion of the document image based at least partially on the location of the MICR line.

40 Claims, 4 Drawing Sheets

FIG. 4 ent, the first standardized feature comprises a MICR line.

ELECTRONIC CHECK AND STUB SEPARATION

FIELD

In general, embodiments of the invention relate to systems, methods, and computer program products for automating the separation of a check and a stub attached to the check in a payment receiving and processing system.

BACKGROUND

Despite the existence of many electronic bill payment systems, many banks, credit card companies, utilities, businesses, and other institutions that bill customers still receive a substantial amount of payments in the mail. Opening, sorting, and processing all of this mail can be costly and time consuming. In the United States, the passing of the Check Clearing for the 21$^{st}$ Century Act ("Check 21") by Congress allowed recipients of paper checks to create a digital version of the paper check called an Image Replacement Document ("IRD"). Under Check 21, IRDs, officially named "Substitute Checks," became a legal substitute for original paper checks. The IRDs generally include front and back images of the original check, together with other data presented by a magnetic ink character recognition (MICR) line along the bottom of the IRD, where such other data typically includes the routing and transit number, the check-writer's account number, and/or the dollar amount of the check.

Many business-to-business payments and other payments are sent in the form of a check attached to a stub, also sometimes referred to as a payment stub or invoice. In such instances, the check is manually separated from the stub before the check is processed or, in an electronic image check system, an image of the check is recorded. Manually separating each check from a payment stub can, in some conventional systems, take an average of at least three seconds per transaction. It has been estimated that, for a large institution that processes, for example, ten million checks per month that are attached to payment stubs, the separating of the check from the stub would translate to approximately $1.5 million annually in labor hours. It has also been estimated that manually separating a check from a stub accounts for approximately eight percent of the time to process a paper check from the time it arrives in an envelope until it is imaged and stored. For these reasons, an automated system for processing checks that have payment stubs attached would be desirable.

SUMMARY

In general, embodiments of the present invention include systems, methods, and computer program products for automating the separation of a check and a stub attached to the check in a payment receiving and processing system. For example, embodiments of the invention include a method implemented by a computerized apparatus configured for capturing a check image, where the method involves: (1) receiving a document image; (2) locating a Magnetic Ink Character Recognition (MICR) line in the document image; and (3) capturing the check image by capturing a portion of the document image based at least partially on the location of the MICR line.

In one embodiment of the method, the method further involves determining whether the MICR line is within a first predefined distance from an edge of the document image. In one such embodiment, capturing the check image involves capturing information in the document image between the edge of the document and a second predefined distance from the edge of the document, wherein the second predefined distance is selected based on whether the MICR line is within the first predefined distance from the edge of the document image. In one embodiment, the second predefined distance is greater than the first predefined distance. In another such embodiment, capturing the check image involves capturing information in the document image between the edge of the document and a second predefined distance from the MICR line, wherein the second predefined distance is selected based on whether the MICR line is within the first predefined distance from the edge of the document image. In one exemplary embodiment, the first predefined distance is between a half inch and two and a half inches, such as a distance of approximately one and a half inches.

In some embodiments of the method, capturing the check image involves locating a perforation line based at least partially on the location of the MICR line, and then capturing the check image by capturing information in the document image between an edge of the document and the perforation line. In one such embodiment, locating a perforation line based at least partially on the location of the MICR line involves searching for the perforation line above the MICR line, if the MICR line is within a first predefined distance from the edge of the document. In one embodiment, searching for the perforation line above the MICR line involves defining a range of distances and then searching for the perforation line within the range of distances above the MICR line. In one such embodiment, the range of distances is between approximately one and a half inches and approximately five inches above the MICR line.

In another embodiment of the invention where capturing the check image involves locating a perforation line based at least partially on the location of the MICR line and then capturing the check image by capturing information in the document image between an edge of the document and the perforation line, the step of locating a perforation line involves searching for the perforation line below the MICR line, if the MICR line is not within a first predefined distance from the edge of the document. In one embodiment, searching for the perforation line below the MICR line involves defining a range of distances and then searching for the perforation line within the range of distances below the MICR line. In one such embodiment, the range of distances is between approximately one eighth of an inch and approximately one and a half inches below the MICR line.

In one embodiment of the method, the method further involves determining the orientation of the MICR line. Such a procedure is performed, in one embodiment, using an image character recognition tool to determine the orientation of the numbers, letters, or other characters that make up the MICR line. In one embodiment, determining the orientation of the MICR line can be used to determine which portion of the document image is "above" the MICR line and which portion is "below" the MICR line.

In one embodiment of the method, the method further involves capturing a payment stub image by capturing a portion of the document image that is not captured as the check image.

Embodiments of the invention further provide a system for capturing an image of a negotiable instrument, the system having a processor configured to: (1) locate a first standardized feature in a document image, said document image comprising an image of a document; and (2) capture the image of the negotiable instrument by capturing a portion of the document image based at least partially on the location of the first standardized feature in the document image. In one embodiment, the negotiable instrument comprises a check and the first standardized feature comprises a character string having an E-13B font or a CMC-7 font, such as, for example, a MICR line.

In one embodiment, the system further includes a scanner configured for capturing the document image. The system may also include a memory device having a first predefined distance stored therein, and, in one such embodiment, the processor is further configured to determine whether the first standardized feature is within a first predefined distance from an edge of the document. In some such embodiments, the memory device also includes a second predefined distance stored therein, and the processor is configured to capture the image of the negotiable instrument by capturing information in the document image between the edge of the document and the second predefined distance from the edge of the document, where the second predefined distance is selected based on whether the first standardized feature is within the first predefined distance from the edge of the document. In other embodiments, the memory device includes a second predefined distance stored therein, and the processor is configured to capture the image of the negotiable instrument by capturing information in the document image between the edge of the document and the second predefined distance from the location of the first standardized feature, where the second predefined distance is selected based on whether the first standardized feature is within the first predefined distance from the edge of the document.

In some embodiments of the system, the processor is configured to capture the image by locating a second standardized feature and by capturing the image of the negotiable instrument by capturing information in the document image between an edge of the document and the second standardized feature. In one embodiment, the second standardized feature is a perforated tear line between the negotiable instrument and a payment stub. In one embodiment, the processor is configured to locate the second standardized feature based at least partially on the location of the first standardized feature.

For example, in one such embodiment, the system includes a memory system having a first predefined distance stored therein, and the processor is configured to locate the second standardized feature based at least partially on the location of the first standardized feature by searching for the second standardized feature above the first standardized feature, if the first standardized feature is within the first predefined distance from the edge of the document. In one such embodiment, the memory system includes a range of distances stored therein, and the processor is configured to search for the second standardized feature above the first standardized feature by searching for the second standardized feature within the range of distances above the first standardized feature.

In other such embodiments, the system includes a memory system having a first predefined distance stored therein, and the processor is configured to locate the second standardized feature based at least partially on the location of the first standardized feature by searching for the second standardized feature below the first standardized feature, if the first standardized feature is not within the first predefined distance from the edge of the document. In one such embodiment, the memory system includes a range of distances stored therein, and wherein the processor is configured to search for the second standardized feature above the first standardized feature by searching for the second standardized feature within the range of distances below the first standardized feature.

In some embodiments of the system, the system further includes a system for determining the orientation of the document by determining the orientation of the first standardized feature. In one embodiment of the system, the processor is configured to separate the document image into the image of the negotiable instrument and an image of a stub. In such an embodiment, the system may further include a payment processing system for processing the negotiable instrument using the image of the negotiable instrument, and a stub processing system for processing the stub using the image of the stub.

Embodiments of the invention further provide a computer program product comprising a computer-readable medium having computer-executable program code stored therein. In one embodiment, the computer-executable program code includes a first code portion configured to locate a first standardized feature in a document image, said document image comprising an image of a document, and a second code portion configured to capture the image of a negotiable instrument by capturing a portion of the document image based at least partially on the location of the first standardized feature in the document image. In some embodiment, the computer program product further includes a code portion configured to determine whether the first standardized feature is within a first predefined distance from an edge of the document. In some embodiments, the computer program product includes a code portion configured to locate a second standardized feature, and a code portion configured to capture the image of the negotiable instrument by capturing information in the document image between an edge of the document and the second standardized feature. In some embodiments, the computer program product includes a code portion configured to locate the second standardized feature based at least partially on the location of the first standardized feature.

Embodiments of the invention further provide a method implemented by a computerized apparatus configured for capturing a check image. In one embodiment, the method involves: (1) receiving a document image; (2) locating a perforation line and a predefined feature in the document image; and (3) capturing the check image by capturing a portion of the document image between the perforation line and an edge of the document such that the predefined feature is between the perforation line and the edge of the document. In one embodiment, the predefined feature comprises a standardized feature of a check, such as, for example, a MICR line.

Embodiments of the invention also provide a system having an image input device, a memory device, and a processor operatively coupled to the image input device and the memory device. The image input device is configured to receive a document image having an image of a document, where the document includes a check attached to a stub. The memory device has computer-readable program code stored therein, and the processor is configured to execute the computer-readable program code to identify the location of a first standardized feature in the document image and electronically separate the document image into a check image and a stub image based at least partially on the location of the first standardized feature in the document image.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art, the present invention may be embodied as a method (including a business process), system, computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, infrared, or semiconductor system, apparatus, device, or propagation medium. More specific examples of the computer-readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-readable medium may be any medium that can contain, store, communicate, propagate, or transport the program for use by or in connection with the instruction execution system, apparatus, or device. The computer-usable program code may be transmitted using any appropriate medium, including but not limited to the Internet, wireline, optical fiber cable, radio frequency (RF) signals, or other mediums.

Computer program code for carrying out operations of embodiments of the present invention may be written in an object-oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Figure 1:
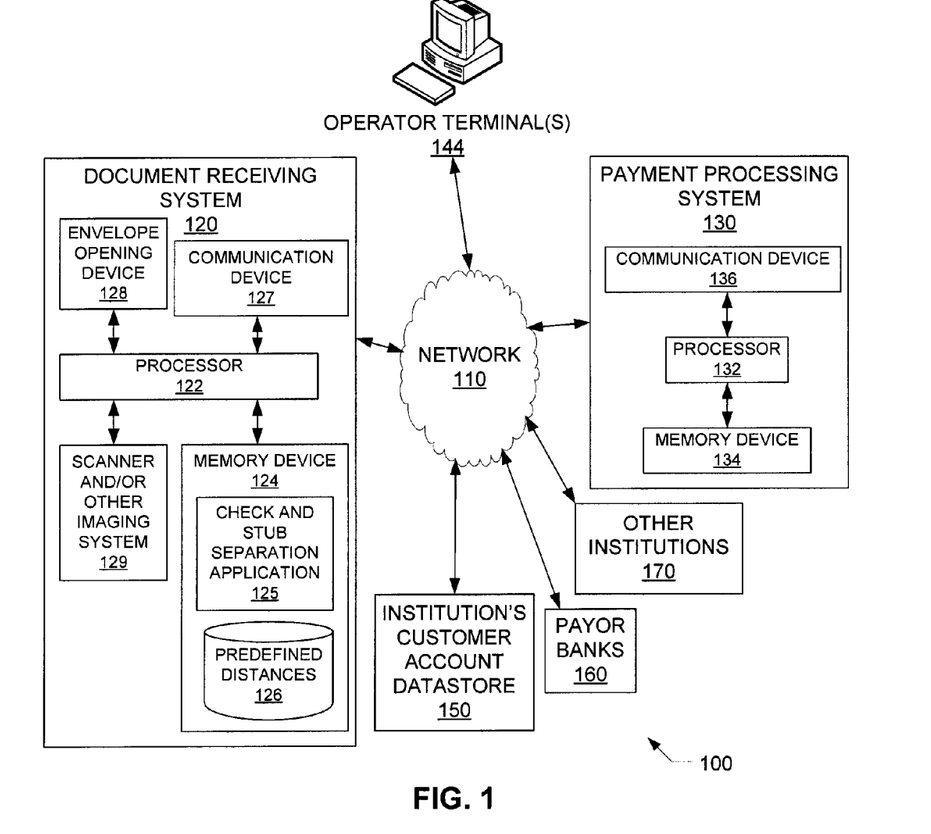
FIG. 1 is a block diagram illustrating a paper-based payment receiving and processing system configured to capture a check image separate from an image of an attached payment stub, in accordance with one embodiment of the present invention.

FIG. 1 illustrates a payment receiving and processing system 100 in accordance with an embodiment of the present invention. The system 100 includes a document receiving system 120 for receiving, scanning, identifying, and capturing data from paper-based payment documents and for separating checks from any stubs attached to the checks. The system 100 also includes a payment processing system 130. The payment processing system 130 is configured to receive information from the document capture system 120 about the received payment documents, and then process the payments based on the information received from the document receiving system 120. In this regard, the document receiving system 120 and the payment processing system 130 are communicably coupled to one another via network 110.

In one embodiment, the network 110 includes a direct wireless or wireline connection between the document receiving system 120 and the payment processing system 130. In other embodiments, however, the network 110 includes one or more other devices that relay communications between the two systems. The network 110 may include a global area network (GAN), such as the Internet, a wide area network (WAN), a local area network (LAN), a wireless network, a wireline network, a virtual private network, and/or the like.

As illustrated in FIG. 1, the document receiving system 120 generally includes a processor 122 operatively coupled to a communication device 126, an envelope opening device 128, a scanner and/or other imaging system 129, and a memory device 124. The processor 122 is configured to use the communication device 127 to communicate with other devices on the network 110, such as the payment processing system 130 and an operator terminal 144. In this regard, the communication device 127 generally comprises a network interface. The network interface may include a modem, server, or other electronic device that communicatively couples the document receiving system 120 to another electronic device or a network 110 of devices.

The processor 122 is also configured to use an envelope opening device 128 for opening envelopes received through the mail or other delivery systems. The processor 122 is further configured to operate one or more scanners and/or imaging systems 129, such as barcode readers, RFID tag readers, image scanners, optical character recognition devices, and/or the like. With these devices, the processor 122 captures information from the envelopes and documents received from the mail. In one embodiment, the envelope opening device, scanner, machine-readable code readers, and/or other aspects of the document receiving system 120 include mail processing devices.

The processor 122 is configured to use the different devices described above to perform certain functions described herein by executing computer-usable program code stored on the memory device 124 and/or received from other devices on the network 110. In this regard, the memory device 124 includes one or more types of computer-readable medium for storing computer-usable program code and other data therein. For example, as illustrated in FIG. 1, in one embodiment the memory device 124 includes a check and stub separation application 125 that instructs the processor how to separate the check from the stub, as described in greater detail below. In addition to storing computer-usable program instructions, the memory device 124 also stores data gathered from the documents captured by the document receiving system 120, such as images of the documents or portions of the documents, as described in greater detail below. Furthermore, the memory device stores other information, such as parameters and variables, used by the check and stub separation application 125 during the procedures described below. Such information includes, in one embodiment, one or more predefined distances 126. These distances may be defined by default values or may be defined by a system administrator or operator using, for example, an operator terminal 144.

Like the document receiving device 120, the payment processing system 130 also includes a processor 132 operatively coupled to a communication device 136 and a memory device 134. The processor 132 is configured to use the communication device 136 to communicate with other devices on the network 110, such as the document receiving system 120, an operator terminal 144, a customer account datastore 150, one or more payor banks 160, and/or other institutions 170 involved in the payment process. In this regard, the communication device 136 generally comprises a network interface. The network interface may include a modem, server, or other electronic device that communicatively couples the payment processing system 130 to another electronic device or a network 110 of devices.

The processor 132 is generally configured to receive information, including payment information such as check images, from the document capture system 120. The processor 132 then uses this information to process payments. In this regard, the processor 132 is configured to perform certain functions described herein by executing computer-usable program code stored on the computer-readable medium making up the memory device 134 or received from other network devices.

As illustrated in FIG. 1, the system 100 also includes one or more operator terminals 144 communicably coupled to the network 110. The operator terminal 144 allows communication between one or more operators and the document receiving system 120 and/or the payment processing system 130. The operator terminal 144 may include a personal computer, laptop, mobile terminal, or other computing device separate from the devices of the document receiving system 120 and the payment processing system 130. In other embodiments, however, the operator terminal 144 or portions thereof are integrated with the communication devices of the document receiving system 120 and/or the payment processing system 130. To facilitate communication between the operator terminal 144 and the document receiving system 120 and/or the payment processing system 130, the operator terminal 144 generally includes a user interface comprising one or more user output devices, such as a display and a speaker or other audio device (e.g., a ringer, buzzer, or bell), and one or more user input devices, such as one or more keys or dials, a touch pad, touch screen, keyboard, mouse, microphone, and/or the like.

It should be appreciated that, although the FIG. 1 illustrates a document receiving system 120, an operator terminal 144, a payment processing system 130, a network 110, and an institution's customer account datastore 150 as separate systems, in some embodiments the separation between two or more of these systems is only conceptual and the two or more systems are actually intertwined, sharing one or more devices between them. Even the institution maintaining the document receiving system 120 and the payment processing system 130 may, in some embodiments, be the same as the payor bank 160, where, for example, a bank maintains the document receiving system 120 and document processing system 130 and receives checks drawn on its customers' accounts. In one embodiment, a bank maintains one or both of the document receiving system 120 and the payment processing system 130, either directly or through an agent, while, in other embodiments, other non-bank entities maintain one or both of the document receiving system 120 and the payment processing system 130.

Figure 2:
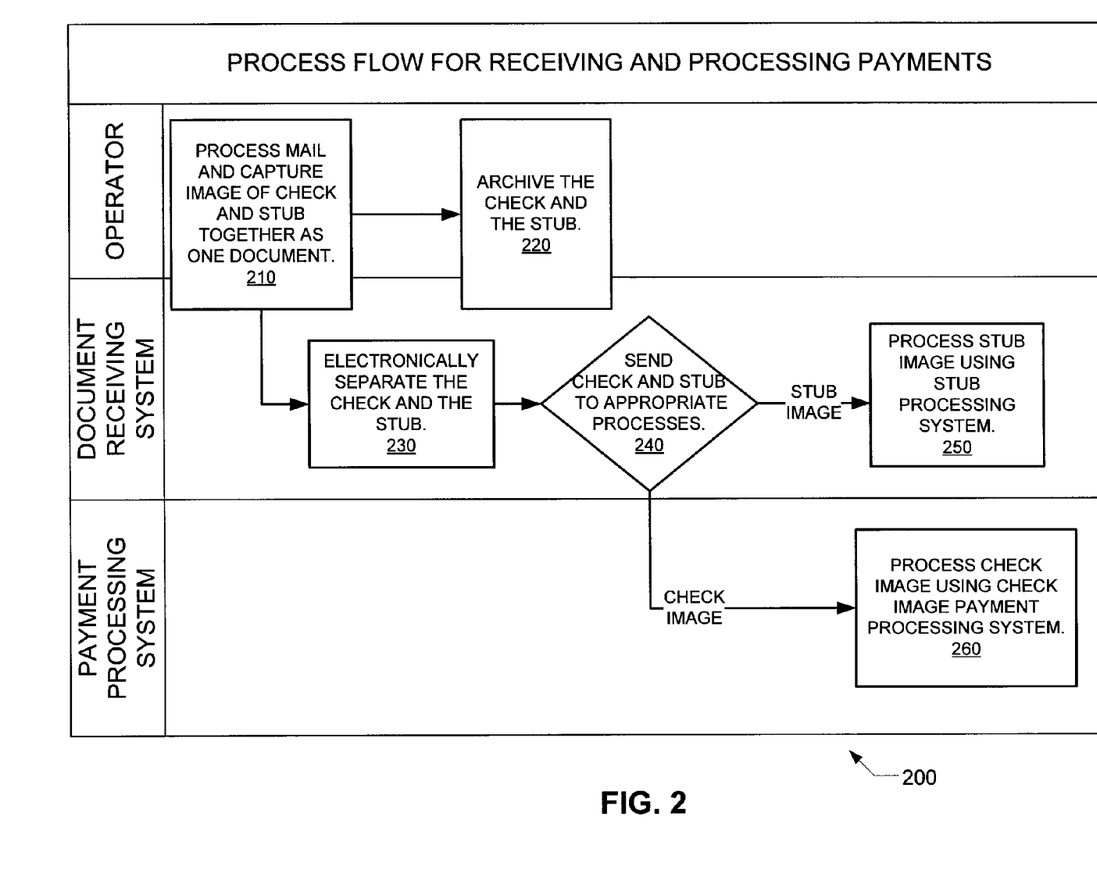
FIG. 2 is a flow diagram illustrating the general process flow of a payment receiving and processing system in which the check is electronically separated from the stub, in accordance with an embodiment of the present invention.

FIG. 2 provides a flow diagram illustrating the general process flow 200 of a payment receiving and processing system 100 in which the check is electronically separated from the stub, in accordance with an embodiment of the present invention. As represented by block 210, the operator generally oversees the receipt and processing of incoming mail by the document receiving system 120. Mail is received from one or more delivery systems. For example, in most instances, mail is received through the U.S. Postal Service or other postal system. In other instances, however, mail may be delivered by hand or by some other method.

In general, the P.O. Box number or other address information on the mail will cause the mail to be directed to a particular lockbox. In one embodiment, the payment receiving and processing system 100 is configured such that it can be used to process payments received in several different lockboxes. In such an embodiment, the operator selects the mail from a particular lockbox and feeds it into the document receiving system 120. The mail for a particular lockbox may be processed in batches. For example, a batch may be all of the mail received in the lockbox on a particular day or within some other period of time.

In general, the mail arrives in an envelope. The document receiving system 120 uses an envelope opening device 128 to open the envelopes and remove the contents of the envelope. In general, the envelope's contents include one or more remittance documents, such as a payment stub or coupon, and one or more forms of payment, such as a check, money order, other negotiable instrument, cash, and/or other forms of payment. As described above, in many instances, the check or other form of payment is attached to a payment stub as a single document, typically separated only by a perforation line. As used herein the terms "stub" and "payment stub" are used interchangeably and include any stub, coupon, invoice, or other document that is not part of the form of payment but is attached to the form of payment, such as, for example, a payment stub integrally formed with a check and separated by a perforation line.

As further represented by block 210, the document receiving system 120 uses its scanner(s) and/or other imaging system(s) 129 to capture an image of and analyze the document containing the check and the stub. In one embodiment, the document receiving system 120 determines the type of document when it receives or scans each document. In one embodiment, an operator identifies the type of document manually. In other embodiments, the type of document is automatically determined using one or more character recognition devices or other machine-readable code readers to identify characters or other machine-readable code or features on the documents that can be used to identify the type of document. In this way, documents containing checks or other forms of payment attached to a stub are identified as such and then subjected to the electronic check and stub separation procedure described below.

As represented by block 220, after a document containing the check and the stub is imaged, the physical document containing the check and the stub is archived as the institution sees fit. In other embodiments, the institution may choose to destroy the physical paper-copy of the document after some length of time since the institution will have electronic copies of the check and the stub after the process described herein is completed and since, in many countries, the check image can be used to represent the check itself between financial institutions in a payment system.

As represented by block 230, after the document receiving system 120 captures an image of a single document containing both a check and a stub, the document receiving system 120 automatically and electronically separates the document image into a check image and a stub image. As represented by block 240, after document receiving system 120 creates the separate check and stub images from the document image, the document receiving system 120 sends the check and stub images to their appropriate processes. For example, in the illustrated embodiment, the stub image is processed by a stub processing system, as represented by block 250, and the check image is processed by the check image payment processing system, as represented by block 260.

In one embodiment, the stub image is reviewed manually or automatically, using, for example, image character recognition tools and other machine-readable code readers, to determine any useful information regarding the payment and/or the customer making the payment, such as information about who the customer is, the customer's contact information, and information about the bill/invoice that the payment is made in response to. This information may be used by the payment processing system 130 to update information in the institution's customer account datastore 150.

The check image may also be reviewed manually or automatically using, for example, image character recognition tools and other machine-readable code readers, to determine any useful information regarding the payment and/or the customer. The document receiving system 120 then transfers, via network 110, the check image and, in some instances, other data obtained from the check image, to the payment processing system 130 where the check image and any other data is processed by the payment processing system 130 in accordance with standard image check procedures. These procedures may involve the payment processing system 130 sending the check image to and/or otherwise communicating with a payor bank 160 and/or other institutions 170 involved in the payment process to request payment for the check or other negotiable instrument. After payment is received by the institution, the payment processing system 130 may then communicate with the institution's customer account datastore 150 to update information about the customer's account for which payment was received.

Figure 3:
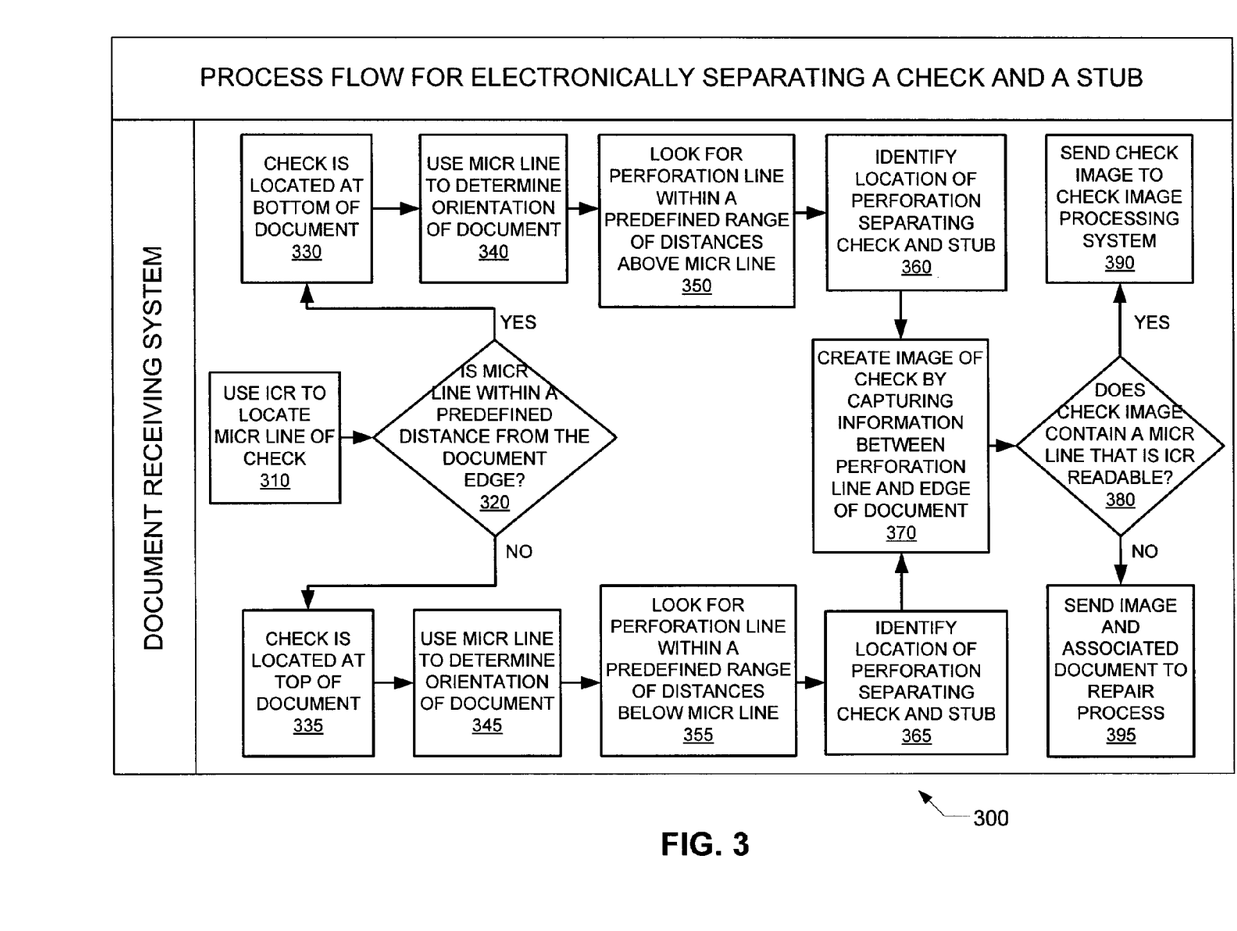
FIG. 3 is a flow diagram illustrating the process of electronically separating a check from a stub in more detail, in accordance with one embodiment of the present invention.

FIG. 3 provides a flow diagram illustrating the process 300 of electronically separating a check from a stub in more detail, in accordance with one embodiment of the present invention. It will be appreciated by one of ordinary skill in the art in view of this disclosure, that FIG. 3 illustrates only one embodiment of the invention and that, in other embodiments of the invention, additional or fewer functions and steps may be present and the functions and steps described herein may, in some cases, occur in different orders.

As illustrated in FIGS. 2 and 3, in one embodiment the process 300 of electronically separating a check from a stub is performed by the document receiving system 120. In other embodiments, however, other systems may perform all or some of the functions and steps of the process 300 illustrated in FIG. 3.

As represented by block 310 of FIG. 3, the process 300 for electronically separating a check and a stub involves the document receiving system 120 using image character recognition (ICR) tools, such as an ICR application stored on the memory device 124, to locate the location of the Magnetic Ink Character Recognition (MICR) line of the check. The MICR line is a line of characters having a standardized font (e.g., E-13B and CMC-7), location, and size that is typically printed in magnetic ink or toner at or near the bottom of many checks. For example, in some countries, such as the United States, Canada, Japan, Australia, Columbia, Venezuela, and the United Kingdom, have adopted E-13B as the standardized font for the MICR line, while other countries, such as Brazil, France, and several other European countries, have adopted CMC-7 as the standardized font for the MICR line. In the United States, the standards for the MICR line are developed and mandated by the American National Standards Institute (ANSI). In many instances, the characters in the MICR line contain a routing number and an account number that can be used to identify the payor bank and the customer's bank account at the payor bank from which the funds will be drawn.

Although the exemplary processes described herein are generally described as using the MICR line in the process to automatically and electronically separate the check from the stub, one of ordinary skill in the art in view of this disclosure will understand that other standardized features of a check or other negotiable instrument or form of payment may be used instead of or in addition to the MICR line. For example, in countries where a MICR line is not used, another similar standardized character string may exist that can be used in the same manner as the MICR line is described herein as being used. Naturally, where another standardized feature is used instead of a MICR line, some of the exemplary predefined distances mentioned in the process described below may not work to accurately separate the check from the stub and would have to be adjusted based on the standardized feature and its relationship to the borders of the check. As used herein, the phrase "standardized feature" does not require that there exist a particular standard put forth or enforced by a particular agency. A "standardized feature" can also include any feature that has a usual, regularized, or accepted form.

As illustrated by the decision block 320 in FIG. 3, after the MICR line is located, the document receiving system 120 determines whether the MICR line is within a predefined distance from an edge of the document. In one embodiment, the document receiving system 120 determines whether the MICR line is within a predefined distance from the bottom edge of the document and, in another embodiment, the document receiving system 120 determines whether the MICR line is contained within a predefined distance from any edge of the document. As illustrated in FIG. 1, in one embodiment the predefined distance used in this step of the process is stored in a memory device 124 of the document receiving system 120. The check and stub separation application 125 may include a default value for the predefined distance and, in one embodiment, this default value can be set or adjusted by an operator using the operator terminal 144. In one exemplary embodiment, the predefined distance is a distance within the range of a half inch and two and a half inches, inclusive, such as, for example, one and a half inches. In another embodiment, the predefined distance is approximately one and a half inches.

As represented by block 330, if the document receiving system 120 determines that the MICR line is within the predefined distance from the document edge, the document receiving system 120 determines that the check is located at the bottom of the document. This is so since, on a standard check in the United States and many countries, the MICR line is located near the bottom of the check. As represented by block 340, the document receiving system 120 may also use the image character recognition (ICR) tools to determine the orientation of the document based on the orientation of the MICR line. In this way, the document receiving system 120 can determine the "top" and "bottom" of the document in the document image and determine what is "above" and "below" the MICR line.

As represented by block 350, if the document receiving system 120 determined that the MICR line is within the predefined distance from the document edge, the document receiving system 120 looks for a perforation tear line within a predefined range of distances above the MICR line. As illustrated in FIG. 1, in one embodiment the predefined range of distances used in this step of the process is stored in a memory device 124 of the document receiving system 120. The check and stub separation application 125 may include a default definition for the predefined range of distances and, in one embodiment, this default value can be set or adjusted by an operator using the operator terminal 144. In one exemplary embodiment, the predefined range of distances is between approximately one and a half inches and approximately five inches above the MICR line. In another embodiment, the predefined range of distances is defined as the range of distances between the MICR line and approximately four inches above the MICR line.

It will be appreciated in view of this disclosure that, in other embodiments of the invention, the document receiving system 120 may look for another standardized feature that typically separates a check from a stub instead of, or in addition to, looking for a perforation line. For example, another standardized feature looked for in this step of the process and other steps described herein as involving a perforation line could be another line, a string of text, a change in color or background design, and/or the like.

As represented by block 360 in FIG. 3, the document receiving system 120 uses image recognition software to locate the perforation line separating the check and the stub 360. As represented by block 370, the document receiving system 120 then creates the check image from the document image by capturing the information in the document image between the perforation line and the edge of the document, where the edge of the document is chosen such that the MICR line is between the perforation line and the edge of the document. The remainder of the document image not used for the check image may be, in one embodiment, used by the document receiving system 120 as the stub image.

Referring again to decision block 320 in FIG. 3, if the document receiving system 120 determines that the MICR line is not within the predefined distance from the document edge, the document receiving system 120 determines that the check is located at the top of the document, as illustrated by block 335. This is so since, as described above, on a standard check in the United States and many countries, the MICR line is located near the bottom of the check. As represented by block 345, the document receiving system 120 may also use the image character recognition (ICR) tools to determine the orientation of the document based on the orientation of the MICR line. As described above, in this way, the document receiving system 120 can determine the "top" and "bottom" of the document in the document image and determine what is "above" and "below" the MICR line.

As represented by block 355, if the document receiving system 120 determined that the MICR line is not within the predefined distance from the document edge, the document receiving system 120 looks for a perforation tear line within a predefined range of distances below the MICR line. As illustrated in FIG. 1, in one embodiment the predefined range of distances used in this step of the process is stored in a memory device 124 of the document receiving system 120. The check and stub separation application 125 may include a default definition for the predefined range of distances and, in one embodiment, this default value can be set or adjusted by an operator using the operator terminal 144. In one exemplary embodiment, the predefined range of distances is between approximately one eighth of an inch and approximately one and a half inches below the MICR line. In another embodiment, the predefined range of distances is defined as the range of distances between the MICR line and approximately two inches below the MICR line.

As represented by block 365 in FIG. 3, the document receiving system 120 uses ICR software to locate the perforation line separating the check and the stub 360. As represented by block 370, the document receiving system 120 then creates the check image from the document image by capturing the information in the document image between the perforation line and the edge of the document, where the edge of the document is chosen such that the MICR line is between the perforation line and the edge of the document. The remainder of the document image not used for the check image may be, in one embodiment, used by the document receiving system 120 as the stub image.

As represented by block 380, in some embodiments, the document receiving system 120 conducts an image quality check on the check image by using ICR software to determine whether the check image contains a MICR line that is readable by ICR software or within a certain standard of readability. If the document receiving system 120 determines that the check image is ICR readable within a certain predefined standard of readability, the document receiving system 120 sends the check image and the associated document to a repair process. If, on the other hand, the document receiving system 120 determines that the check image is ICR readable, the check image is sent to a check image processing system where the check image represents the actual check and proceeds through the check clearing process.

It should be appreciated that FIG. 3 illustrates only one exemplary embodiment of the invention and that other embodiments will be apparent to one of ordinary skill in the art in view of this disclosure. For example, it will be appreciated that, in other embodiments of the invention, some steps in the processes described herein may be performed in a different order than described herein or may, in some embodiments, be optional or eliminated. For example, the step of determining the orientation of the document described in reference to blocks 340 and 345 may, in other embodiments of the invention, be performed earlier in the process 300. In one embodiment, the step of determining the orientation of the document is performed before the document is scanned. For example, in one embodiment, the document receiving device 120 is configured to use a magnetic ink character recognition system to determine the orientation of the MICR line and then use this information to determine the orientation of the document and position the document in the image scanner such that the document is scanned having a know orientation in the image.

In still other embodiments of the invention, the orientation of the document may not be needed for the procedure 300 illustrated in FIG. 3. For example, in one embodiment, an algorithm may be used to determine the top or bottom of the document or which side of the MICR line to measure a predefined distance from or to look for the perforation line. For example, in one embodiment, if the MICR line is within the first predefined distance of a document edge, then that edge is determined to be the "bottom" of the document. In one such embodiment, if the MICR line is not within the first predefined distance of a document edge, then the document edge that is closest to the MICR line (not including the document edges at either end of the MICR line) is determined to be the "top" of the document. In still other embodiments, the document receiving system 120 looks for the perforation line within four inches of either side of MICR line or within four inches of the side of the MICR line opposite the closest document edge.

Figure 4:
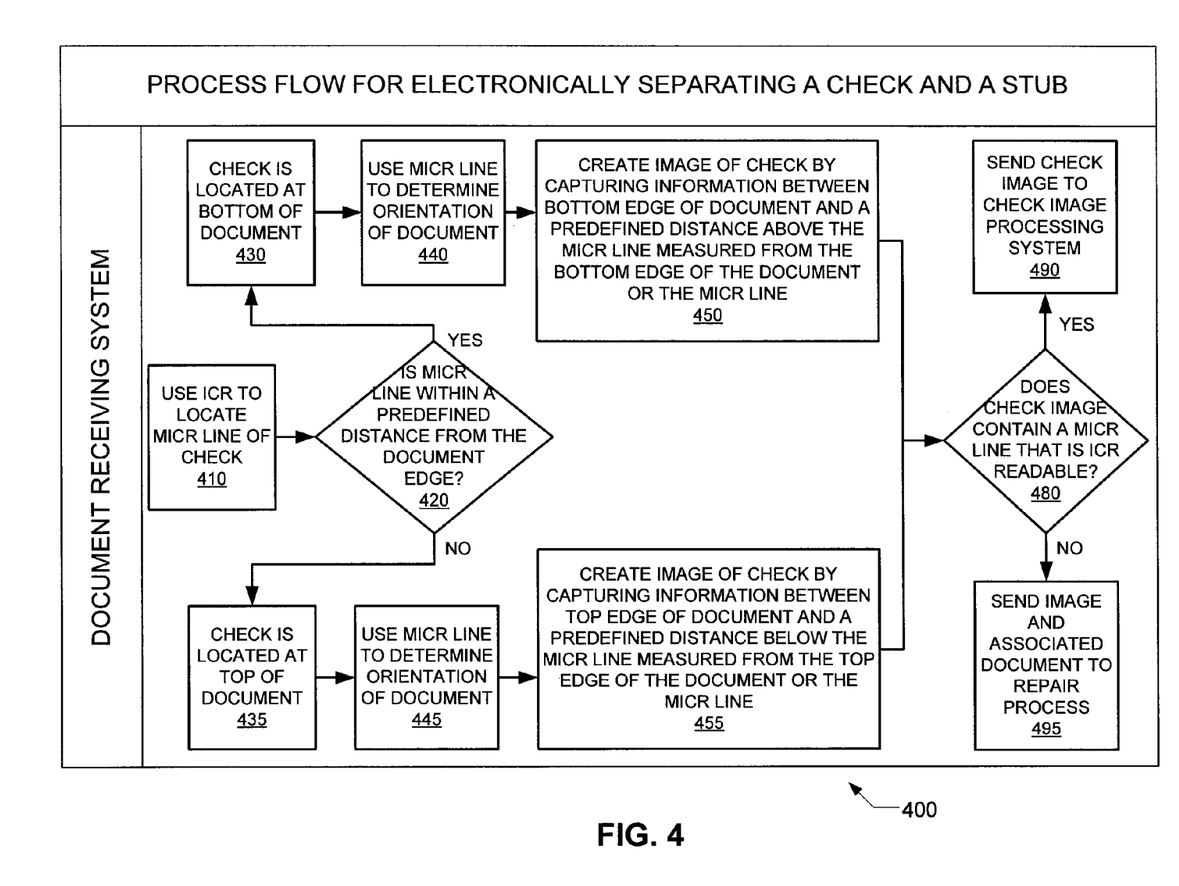
FIG. 4 is a flow diagram illustrating the process of electronically separating a check from a stub in more detail, in accordance with another embodiment of the present invention.

FIG. 4 provides a flow diagram illustrating a process 400 of electronically separating a check from a stub in more detail, in accordance with another embodiment of the present invention. It will be appreciated by one of ordinary skill in the art in view of this disclosure, that FIG. 4 illustrates only one embodiment of the invention and that, in other embodiments of the invention, additional or fewer functions and steps may be present and the functions and steps described herein may, in some cases, occur in different orders.

As represented by block 410 of FIG. 4, like the process described in FIG. 3, the process 400 for electronically separating a check and a stub involves the document receiving system 120 using image character recognition (ICR) tools, such as an ICR application stored on the memory device 124, to locate the location of the Magnetic Ink Character Recognition (MICR) line of the check. As described above, although the exemplary processes described herein are generally described as using the MICR line in the process to automatically and electronically separate the check from the stub, one of ordinary skill in the art in view of this disclosure will understand that other standardized features of a check or other negotiable instrument or form of payment may be used instead of or in addition to the MICR line.

As illustrated by the decision block 420 in FIG. 4 and as described above in relation to block 320 of FIG. 3, after the MICR line is located, the document receiving system 120 determines whether the MICR line is within a predefined distance from an edge of the document.

As represented by block 430, if the document receiving system 120 determines that the MICR line is within the predefined distance from the document, the document receiving system 120 determines that the check is located at the bottom of the document. As represented by block 440, the document receiving system 120 may also use the image character recognition (ICR) tools to determine the orientation of the document based on the orientation of the MICR line. In this way, the document receiving system 120 can determine the "top" and "bottom" of the document in the document image and determine what is "above" and "below" the MICR line. As represented by block 450, if the document receiving system 120 determined that the MICR line is within the predefined distance from the document edge, the document receiving system 120 creates the check image by capturing information between the bottom edge of the document and a predefined distance above the MICR line measured from the bottom edge of the document or the MICR line. As illustrated in FIG. 1, in one embodiment the predefined distance used in this step of the process is stored in a memory device 124 of the document receiving system 120. The check and stub separation application 125 may include a default value for the predefined distance and, in one embodiment, this default value can be set or adjusted by an operator using the operator terminal 144. In one exemplary embodiment, the predefined distance is a distance within the range of two and a half inches and five inches and is selected by an operator based on the standard or average height of a check and whether the measurement is being made from the top of the document or from the MICR line.

Referring again to decision block 420 in FIG. 4, if the document receiving system 120 determines that the MICR line is not within the predefined distance from the document edge, the document receiving system 120 determines that the check is located at the top of the document, as illustrated by block 435. As represented by block 445, the document receiving system 120 may also use the image character recognition (ICR) tools to determine the orientation of the document based on the orientation of the MICR line. As described above, in this way, the document receiving system 120 can determine the "top" and "bottom" of the document in the document image and determine what is "above" and "below" the MICR line. As represented by block 455, if the document receiving system 120 determined that the MICR line is not within the predefined distance from the document edge, the document receiving system 120 creates the check image by capturing information between the top edge of the document and a predefined distance below the MICR line measured from the top edge of the document or the MICR line. As illustrated in FIG. 1, in one embodiment the predefined distance used in this step of the process is stored in a memory device 124 of the document receiving system 120. The check and stub separation application 125 may include a default value for the predefined distance and, in one embodiment, this default value can be set or adjusted by an operator using the operator terminal 144. In one exemplary embodiment, the predefined distance used in this step is a distance within the range of a sixteenth of an inch and five inches and is selected by an operator based on the standard or average height of a check and whether the measurement is being made from the top of the document or from the MICR line.

As represented by block 480 and as described above with reference to block 380 in FIG. 3, in some embodiments, the document receiving system 120 conducts an image quality check on the check image by using ICR software to determine whether the check image contains a MICR line that is readable by ICR software or within a certain standard of readability. If the document receiving system 120 determines that the check image is ICR readable within a certain predefined standard of readability, the document receiving system 120 sends the check image and the associated document to a repair process. If, on the other hand, the document receiving system 120 determines that the check image is ICR readable, the check image is sent to a check image processing system where the check image represents the actual check and proceeds through the check clearing process.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method implemented by a computerized apparatus configured for capturing a check image, the method comprising:
   receiving, via a processor, a document image comprising an image of a document;
   locating, using a processor, using image character recognition (ICR) tools, a Magnetic Ink Character Recognition (MICR) line in the document image;
   determining whether the MICR line is readable within a predefined standard of readability;
   in response to determining the MICR line is not readable within the predefined standard of readability, repairing the document image so that the MICR line meets the predefined standard or readability;
   determining, using a processor, whether the MICR line is within a first predefined distance from an edge of the document;
   determining, using a processor, an orientation of the MICR line;
   determining, using a processor, an orientation of the document image based on the orientation of the MICR line;
   positioning the document image based on the orientation of the MICR line;
   capturing, using a processor, the check image by capturing a portion of the document image based at least partially on the location of the MICR line and based at least partially on the orientation of the document image, wherein the check image comprises an entire check image;
   capturing a payment stub image by capturing a portion of the document image that is not captured as the check image;
   determining user identity information, user contact information, and invoice information associated with the check image based on information extracted from the payment stub image, and not based on information extracted from the check image; and
   updating user account information based on the information extracted from the payment stub image, wherein determining the orientation of the MICR line is performed before capturing the entire check image.

2. The method of claim 1, wherein capturing the check image by capturing a portion of the document image based at least partially on the location of the MICR line comprises:
   capturing the check image by capturing information in the document image between the edge of the document and a second predefined distance from the edge of the document, wherein the second predefined distance is selected based on whether the MICR line is within the first predefined distance from the edge of the document.

3. The method of claim 2, wherein the second predefined distance is greater than the first predefined distance.

4. The method of claim 1, wherein capturing the check image by capturing a portion of the document image based at least partially on the location of the MICR line comprises:
   capturing the check image by capturing information in the document image between the edge of the document and a second predefined distance from the MICR line, wherein the second predefined distance is selected based on whether the MICR line is within the first predefined distance from the edge of the document.

5. The method of claim 1, wherein the first predefined distance is between a half inch and two and a half inches.

6. The method of claim 1, wherein the first predefined distance is approximately one and a half inches.

7. The method of claim 1, wherein capturing the check image by capturing a portion of the document image based at least partially on the location of the MICR line comprises:
   locating a perforation line based at least partially on the location of the MICR line; and
   capturing the check image by capturing information in the document image between an edge of the document and the perforation line.

8. The method of claim 7, wherein locating a perforation line based at least partially on the location of the MICR line comprises:
   searching for the perforation line above the MICR line, if the MICR line is within the first predefined distance from the edge of the document.

9. The method of claim 8, wherein searching for the perforation line above the MICR line comprises:
   defining a range of distances; and
   searching for the perforation line within the range of distances above the MICR line.

10. The method of claim 9, wherein the range of distances is between one and a half inches and five inches above the MICR line.

11. The method of claim 7, wherein locating a perforation line based at least partially on the location of the MICR line comprises:
    searching for the perforation line below the MICR line, if the MICR line is not within the first predefined distance from the edge of the document.

12. The method of claim 11, wherein searching for the perforation line below the MICR line comprises:
    defining a range of distances; and
    searching for the perforation line within the range of distances below the MICR line.

13. The method of claim 12, wherein the range of distances is between approximately one eighth of an inch and approximately one and a half inches below the MICR line.

14. The method of claim 1, further comprising:
   determining a perforation tear line within a predetermined distance of the MICR line; and
   wherein the capturing step further comprises capturing, using a processor, the check image by capturing a portion of the document image based at least partially on a location of the perforation tear line.

15. A system for capturing an image of a negotiable instrument, the system comprising:
   a memory device having a first predefined distance stored therein; and
   a processor configured to:
      locate using image character recognition (ICR) tools a first standardized feature in a document image, said document image comprising an image of a document, wherein the first standardized feature comprises a Magnetic Ink Character Recognition (MICR) line;
      determine whether the first standardized feature is readable within a predefined standard of readability;
      in response to determining the first standardized feature is not readable within the predefined standard of readability, repair the document image so that the first standardized feature meets the predefined standard or readability;
      determine whether the first standardized feature is within the first predefined distance from an edge of the document;
      determine an orientation of the first standardized feature;
      determine an orientation of the document image based on the orientation of the first standardized feature;
      position the document image based on the orientation of the first standardized feature;
      capture the image of the negotiable instrument by capturing a portion of the document image based at least partially on the location of the first standardized feature in the document image and based at least partially on the orientation of the document image, wherein the image of the negotiable instrument comprises an entire image of the negotiable instrument;
      capture a payment stub image by capturing a portion of the document image that is not captured as the image of the negotiable instrument;
      determine user identity information, user contact information, and invoice information associated with the image of the negotiable instrument based on information extracted from the payment stub image, and not based on information extracted from the image of the negotiable instrument; and
      update user account information based on the information extracted from the payment stub image, wherein determining the orientation of the first standardized feature is performed before capturing the entire image of the negotiable instrument.

16. The system of claim 15, wherein the negotiable instrument comprises a check.

17. The system of claim 15, wherein the first standardized feature comprises a character string having a E-13B font or a CMC-7 font.

18. The system of claim 15, further comprising:
   a scanner configured for capturing the document image.

19. The system of claim 15, wherein the memory device comprises a second predefined distance stored therein, and wherein the processor is configured to capture the image of the negotiable instrument by capturing information in the document image between the edge of the document and the second predefined distance from the edge of the document, wherein the second predefined distance is selected based on whether the first standardized feature is within the first predefined distance from the edge of the document.

20. The system of claim 15, wherein the memory device comprises a second predefined distance stored therein, and wherein the processor is configured to capture the image of the negotiable instrument by capturing information in the document image between the edge of the document and the second predefined distance from the location of the first standardized feature, wherein the second predefined distance is selected based on whether the first standardized feature is within the first predefined distance from the edge of the document.

21. The system of claim 15, wherein the processor is configured to capture the image by:
   locating a second standardized feature; and
   capturing the image of the negotiable instrument by capturing information in the document image between an edge of the document and the second standardized feature.

22. The system of claim 21, wherein the second standardized feature comprises a perforated tear line between the negotiable instrument and the payment stub.

23. The system of claim 21, wherein the processor is configured to locate the second standardized feature based at least partially on the location of the first standardized feature.

24. The system of claim 23, further comprising a memory system comprising the first predefined distance stored therein, wherein the processor is configured to locate the second standardized feature based at least partially on the location of the first standardized feature by searching for the second standardized feature above the first standardized feature, if the first standardized feature is within the first predefined distance from the edge of the document.

25. The system of claim 24, wherein the memory system comprises a range of distances stored therein, and wherein the processor is configured to search for the second standardized feature above the first standardized feature by searching for the second standardized feature within the range of distances above the first standardized feature.

26. The system of claim 23, further comprising a memory system comprising the first predefined distance stored therein, wherein the processor is configured to locate the second standardized feature based at least partially on the location of the first standardized feature by searching for the second standardized feature below the first standardized feature, if the first standardized feature is not within the first predefined distance from the edge of the document.

27. The system of claim 26, wherein the memory system comprises a range of distances stored therein, and wherein the processor is configured to search for the second standardized feature above the first standardized feature by searching for the second standardized feature within the range of distances below the first standardized feature.

28. The system of claim 15, further comprising:
   a system for determining the orientation of the document by determining the orientation of the first standardized feature.

29. The system of claim 15, wherein the processor is configured to separate the document image into the image of the negotiable instrument and an image of the payment stub, and wherein the system further comprises:
   a payment processing system for processing the negotiable instrument using the image of the negotiable instrument; and
   a stub processing system for processing the payment stub using the image of the payment stub.

30. A computer program product comprising a non-transitory computer-readable medium having computer-executable program code stored therein, wherein said computer-executable program code comprises:

a first code portion configured to locate, using image character recognition (ICR) tools, a first standardized feature in a document image, said document image comprising an image of a document, wherein the first standardized feature comprises a Magnetic Ink Character Recognition (MICR) line;

a second code portion configured to:

determine whether the first standardized feature is readable within a predefined standard of readability;

in response to determining the first standardized feature is not readable within the predefined standard of readability, repair the document image so that the first standardized feature meets the predefined standard or readability;

determine whether the first standardized feature is within a first predefined distance from an edge of the document;

determine an orientation of the first standardized feature; and determine an orientation of the document image based on the orientation of the first standardized feature;

position the document image based on the orientation of the first standardized feature; and a third code portion configured to:

capture the image of a negotiable instrument by capturing a portion of the document image based at least partially on the location of the first standardized feature in the document image and based at least partially on the orientation of the document image, wherein the image of the negotiable instrument comprises an entire image of the negotiable instrument;

capture a payment stub image by capturing a portion of the document image that is not captured as the image of the negotiable instrument;

determine user identity information, user contact information, and invoice information associated with the image of the negotiable instrument based on information extracted from the payment stub image, and not based on information extracted from the image of the negotiable instrument; and update user account information based on the information extracted from the payment stub image, wherein determining the orientation of the first standardized feature is performed before capturing the entire image of the negotiable instrument.

31. The computer program product of claim 30, wherein the negotiable instrument comprises a check.

32. The computer program product of claim 30, wherein the first standardized feature comprises a character string having a E-13B font or a CMC-7 font.

33. The computer program product of claim 30, comprising:

a code portion configured to locate a second standardized feature; and a code portion configured to capture the image of the negotiable instrument by capturing information in the document image between an edge of the document and the second standardized feature.

34. The computer program product of claim 33, wherein the second standardized feature comprises a perforated tear line between the negotiable instrument and the payment stub.

35. The computer program product of claim 33, comprising:

a code portion configured to locate the second standardized feature based at least partially on the location of the first standardized feature.

36. A method implemented by a computerized apparatus configured for capturing a check image, the method comprising:

receiving, via a processor, a document image;

locating, using a processor, using image character recognition (ICR) tools, a perforation line and a predefined feature in the document image, wherein the predefined feature comprises a MICR line;

determining whether the predefined feature is readable within a predefined standard of readability;

in response to determining the predefined feature is not readable within the predefined standard of readability, repairing the document image so that the predefined feature meets the predefined standard or readability;

determining, using a processor, whether the predefined feature is within a first predefined distance from an edge of the document;

determining an orientation of the predefined feature;

determining an orientation of the document image based on the orientation of the predefined feature;

positioning the document image based on the orientation of the predefined feature;

capturing, using a processor, based on the orientation of the document image, the check image by capturing a portion of the document image between the perforation line and an edge of the document such that the predefined feature is between the perforation line and the edge of the document, wherein the check image comprises an entire check image;

capturing a payment stub image by capturing a portion of the document image that is not captured as the check image;

determining user identity information, user contact information, and invoice information associated with the check image based on information extracted from the payment stub image; and updating user account information based on the information extracted from the payment stub image, wherein determining the orientation of the predefined feature is performed before capturing the entire check image.

37. The method of claim 36, wherein the predefined feature comprises a standardized feature of a check.

38. A system comprising:

an image input device for receiving a document image comprising an image of a document, the document having a check attached to a stub;

a memory device comprising computer-readable program code stored therein; and a processor operatively coupled to the image input device and the memory device and configured to execute the computer-readable program code to:

identify, using image character recognition (ICR) tools, the location of a first standardized feature in the document image, wherein the first standardized feature comprises a MICR line;

determine whether the first standardized feature is readable within a predefined standard of readability;

in response to determining the first standardized feature is not readable within the predefined standard of readability, repair the document image so that the first standardized feature meets the predefined standard or readability;

determine whether the first standardized feature is within a first predefined distance from an edge of the document;

determine an orientation of the first standardized feature;
determine an orientation of the document image based on the orientation of the first standardized feature;
position the document image based on the orientation of the first standardized feature;
electronically separate the document image into a check image and a stub image based at least partially on the location of the first standardized feature in the document image and based at least partially on the orientation of the document image, wherein the check image comprises an entire check image;
determine user identity information, user contact information, and invoice information associated with the check image based on information extracted from the stub image, and not based on information extracted from the check image; and
update user account information based on the information extracted from the stub image, wherein determining the orientation of the first standardized feature is performed before capturing the entire check image.

39. The method of claim 1, wherein determination of the orientation of the document image enables determination of a top portion and a bottom portion of the document image.

40. The method of claim 1, wherein determination of the orientation of the document image enables determination of information located above the MICR line and information located below the MICR line.

* * * * *